United States Patent [19]

Williams

[11] 3,953,830

[45] Apr. 27, 1976

[54] STEERING MECHANISM INACTIVITY WARNING DEVICE

[75] Inventor: Don W. Williams, Elida, Ohio

[73] Assignee: Floren R. Klopfenstein, Fort Wayne, Ind.

[22] Filed: Feb. 27, 1974

[21] Appl. No.: 446,319

[52] U.S. Cl. .................. 340/52 R; 340/279; 200/61.54; 180/99; 180/103 R
[51] Int. Cl.² .................. B60Q 1/00; H01H 9/00
[58] Field of Search .................. 340/52 R, 52 F, 53, 340/279, 267 R; 200/61.54, 61.56; 180/99, 103; 317/141 S

[56] References Cited
UNITED STATES PATENTS

| | | | |
|---|---|---|---|
| 3,106,981 | 10/1963 | Chakiris | 340/279 X |
| 3,222,639 | 12/1965 | Kayser | 340/279 X |
| 3,222,640 | 12/1965 | Wurst | 340/53 |
| 3,559,205 | 1/1971 | Colby | 200/61.54 X |
| 3,588,864 | 6/1971 | Gaulke | 200/61.54 X |
| 3,594,772 | 7/1971 | Setser | 180/99 X |
| 3,631,446 | 12/1971 | Setser | 200/61.54 |
| 3,794,969 | 2/1974 | Klopfenstein | 340/52 R |

Primary Examiner—John W. Caldwell
Assistant Examiner—William M. Wannisky
Attorney, Agent, or Firm—Albert L. Jeffers; Roger M. Rickert

[57] ABSTRACT

A safety device which may be coupled to a vehicle steering mechanism to provide an alarm indication of drowsiness or other inadequate steering activity by the operator, is disclosed comprising a transducer for providing a broad-band electrical signal in response to steering activity by the operator for all operable positions of the steering mechanism along with circuitry for monitoring this electrical signal and energizing an alarm when the electrical signal fails to satisfy some prescribed minimum condition. In one embodiment, a piezoelectric crystal is in contact with the steering shaft and the electrical output of the crystal is first amplified and then employed to maintain a charge on a capacitor. Means responsive to the capacitor charge falling outside the preferred charge range then energizes the alarm. In a second preferred embodiment, first and second conductive members comprising a portion of the vehicle horn actuating mechanism supply extremely weak signals to a preamplifier-detector circuit the output of which in turn is amplified and employed to maintain a capacitor charge within prescribed limits as in the first embodiment.

17 Claims, 3 Drawing Figures

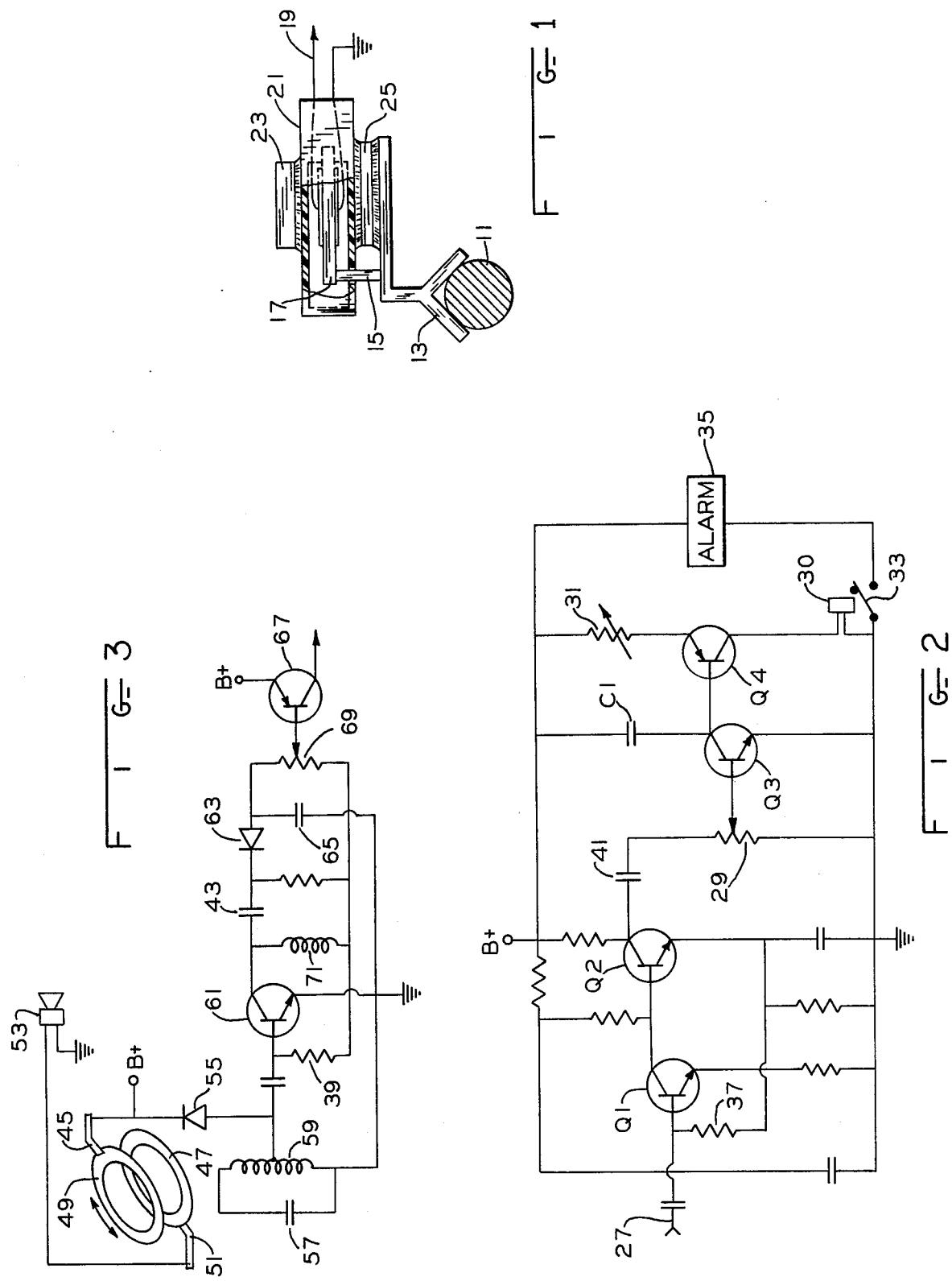

STEERING MECHANISM INACTIVITY WARNING DEVICE

BACKGROUND OF THE INVENTION

The present invention relates to an alarm device and more particularly to apparatus for warning the driver of a vehicle of inadequate steering activity such as would occur when the vehicle operator is drowsy or intoxicated.

There have innumerable attempts to provide such an alarm apparatus for motor vehicle opeators and U.S. Pats. Nos. 2,848,712; 2,875,430; 3,106,981; 3,222,639; and 3,222,640 as well as copending Ser. No. 325,920 filed Jan. 22, 1973 and entitled "APPARATUS FOR ALERTING VEHICLE DRIVER" are representative of the prior art. The prior art devices sense actuation of the steering wheel by the operator and generally provide an alarm indication when the wheel has not been moved for a predetermined time interval. The prior art devices generally are not capable of sensing steering wheel motion for all possible steering wheel positions, but rather are limited to a segment only of one full revolution of the steering wheel. The prior art devices typically attach to the steering wheel or hub thereof presenting an unsightly addition to the vehicle interior as well as running afoul of innumerable mounting problems with the more modern enlarged steering columns. The prior art devices employ complicated mechanical linkages, cam actuated switches, commutator segments, or photoelectric sensing, but none employ a direct simple transducer for converting mechanical movement directly to an electrical signal. The prior devices all encounter difficulties in adapting their mounting structure to the wide variety of steering mechanisms presently being used.

It is accordingly a primary object of the present invention to overcome one or more of the foregoing prior art deficiencies.

One object of the present invention is to provide a warning device employing a mechanical to electrical transducer where mechanical movement of a steering mechanism is converted directly to an electrical signal.

Another object of the present invention is to eliminate cam actuated switches, commutator-like moving contacts, and thermal delay devices of the prior art warning devices.

A further object of the present invention is to provide a warning device which employs a minimum of additional components for sensing steering activity.

A still further object of the present invention is to eliminate complex mechanical contrivances for sensing steering activity.

Yet another object of the present invention is to eliminate any additional motion sensing structure associated with the steering wheel as such or otherwise disposed within the passenger compartment of a vehicle.

A salient object of the present invention is to provide a warning device which is sensitive throughout one or more complete revolutions of a steering wheel.

Still another object of the present invention is to provide a warning device characterized by its ease of installation on existing vehicles and its universal adaptability thereto.

SUMMARY OF THE INVENTION

The foregoing features, objects and advantages of the present invention are achieved in a first embodiment by providing a piezoelectric mechanical to electrical transducing device which is directly responsive to surface irregularities in a vehicle steering shaft to provide a broad-band signal which is thereafter amplified and employed when inadequate to trigger an audio alarm. In a second embodiment a similar but weaker broad-band signal is derived from the horn actuating contacts presently employed in virtually all vehicles and this weaker broad-band signal is passed by way of a resonant circuit through a preamplifying and detecting circuit to thereafter be processed as in the first embodiment.

The precise manner in which the foregoing objects, features and advantages of the present invention may be realized will be better understood from the following detailed descriptions of two exemplary embodiments when read in conjunction with the accompanying drawing in which:

BRIEF DESCRIPTION OF THE DRAWING

FIG. 1 is a view partially in section and partially broken away illustrating the coupling of a piezoelectric transducer to a steering shaft.

FIG. 2 is a schematic diagram of amplifier and alarm circuitry to be used in conjunction with the transducer of FIG. 1.

FIG. 3 illustrates an alternate transducer and preamplifier system the output of which may be employed as the input to the amplifier and alarm circuitry of FIG. 2.

DESCRIPTION OF THE PREFERRED EMBODIMENT

In FIG. 1 the steering shaft 11 which is generally exposed and readily accessible within the vehicle engine compartment has a rider or arm 13 in firm mechanical contact therewith. Thus any steering activity by the vehicle operator will be reflected in rotation of the steering shaft and picked up by the rider for all operable positions of the steering mechanism. The rider or cam 13 then transmits this motion by way of push rod 15 to a piezoelectric crystal 17. The piezoelectric crystal 17 has electrical contacts thereon in well-known fashion and provides an electrical output signal between the output line 19 and ground which signal will generally be a broad-band signal due to the lack of uniformity in the steering shaft irregularities and due to non-uniform speeds of rotation of that shaft. The piezoelectric crystal 17 will typically be enclosed in a protective housing 21 and that housing may, for example, be bonded to a fixed portion of the vehicle in a shock absorbing manner, for example, by the layer 23 of rubber or similar material. The arm 13 is also flexibly affixed to the protective housing 21 by, for example, bonding the two together by way of the layer 25 of rubber or similar material. The broad-band output signal on line 19 is then supplied to the input terminal 27 of FIG. 2.

FIG. 2 depicts circuitry for amplifying a motion indicative signal and for energizing an alarm when that signal fails to meet specified criteria. Transistors Q1 and Q2 are directly coupled to form a high gain amplifying means and the output of transistor Q2 is supplied to the base of transistor Q3 by way of potentiometer 29. So long as steering movement is occurring the signal applied on input terminal 27 will be amplified by the transistors Q1 and Q2 and presuming proper setting of the potentiometer 29 will maintain the transistor Q3 in a highly conductive state. The primary function of the potentiometer 29 is to adjust the sensitivity of the circuit so that when steering motion ceases the output of the transistor Q2 will be inadequate to maintain the high conduction level in transistor Q3 and the capacitor C1 will discharge sufficiently to cause a decrease in the collector-emitter current flow in transistor Q4 to a level that is no longer adequate to maintain sufficient current in the relay winding 30 to hold that relay with its normally closed contacts open and thus cause the armature 33 of the relay to return to its rest position and energize the electrically energizable alarm 35. The voltage accumulated on the capacitor C1 is, of course, the integral of its current with respect to time and thus the charge on the capacitor is representative of steering activity. The level at which the relay winding 30 fails to maintain the relay armature 33 in the position illustrated is, of course, in part determined by the emitter to base voltage on the transistor Q4 which in turn is in part determined by the voltage on the capacitor C1 but additionally this current may be controlled by a potentiometer 31. When steering activity ceases and the input signal to the transistor Q3 drops, the capacitor C1 will discharge in part through the potentiometer 31 and emitter to base circuit of the transistor Q4 and also to a lesser degree through several paths one of which includes the potentiometer 29. Thus the potentiometer 31 functions primarily to determine the time lag between complete steering inactivity and energization of the alarm 35 whereas the potentiometer 29 functions primarily to control the sensitivity of the system, that is the minimum steering activity which is sufficient to prevent an alarm indication, but additionally has some control over the time delay feature. The time lag between complete steering cessation and an alarm indication also will in part depend on the particular charge on the capacitor C1 which in turn is dependent on the level of recent steering activity and thus the time delay is not a particular fixed value.

A suitable input signal for input terminal 27 of FIG. 2 may also be derived from the structure and preamplifier system of FIG. 3. FIGS. 2 and 3 have biasing elements such as 37 and 39 and direct current isolation elements such as 41 and 43 which perform their normal function such circuits and need not be discussed in detail. The circuit of FIG. 3 is unique in that its input comprises a broad-band signal of noise or static caused by relative motion of a conductive brush 45 which slidably engages an annular conductive member 49. These elements form a part of a typical steering wheel horn actuating device. Typically, a second annular conductive member 47 and a second conductive brush 51 are supported in close proximity to the members 45 and 49 and the rings 47 and 49 experience rotation relative to the brushes 45 and 51 during normal steering activity. Depression of the horn button causes contact between the annular members 47 and 49 thus allowing current flow from the, for example, positive terminal of the battery through brush 51, member 49, member 47 and brush 45 to a horn 53. A diode 55 prevents the application of this positive battery voltage to the remainder of the circuit of FIG. 3. During normal driving conditions the relative rotation of the members 45 and 47 as illustrated by the arrows causes slight broad-band noise or static to pass through the diode 55 to a tuned circuit comprising capacitor 57 and inductance 59. Signals at the resonant frequency of the tuned circuit are supplied to the base of transistor 61 and amplified thereby after which the signals are detected by diode 63 and the high frequency components of that detected signal bypassed to ground by way of the capacitor 65. The remaining portion of the original broad-band noise signal is presented to a second amplifying transistor 67 by way of potentiometer 69 and the output of transistor 67 may be supplied to input terminal 27 of FIG. 2 for subsequent processing as discussed previously. Potentiometer 69 like potentiometer 29 functions as a sensitivity control for the system. A radio frequency choke 71 may be provided to prevent the degenerative feedback of signals in the range of resonance of the tuned circuits 57 and 59.

Thus, while the present invention has been described with respect to a particular preferred embodiment, numerous modifications will suggest themselves to those of ordinary skill in the art and accordingly the scope of the present invention is to be measured only by that of the appended claims.

I claim:

1. A safety device for providing an alarm indicative of inadequate steering activity by a vehicle operator comprising:

mechanical to electrical transducer means for providing a broad-band electrical signal in response to steering activity by the operator for all operable positions of the steering mechanism, the transducer converting mechanical movement directly to electrical energy;

amplifier means for amplifying at least part of the frequency spectrum of the transducer provided signal;

a capacitor;

means coupling the capacitor to the amplifier means for employing the amplified at least part of the signal to maintain a charge on the capacitor in a preferred charge range;

an energizable audio alarm; and means responsive to the charge on the capacitor falling outside the preferred charge range for energizing the audio alarm including a transistor with the base thereof coupled to the capacitor whereby the conductivity of the transistor is determined at least in part by the charge on the capacitor.

2. The device of claim 1 further comprising a relay having the winding thereof in series with the collector-emitter circuit of the transistor whereby the relay is energized only when the collector-emitter current in the transistor is greater than a predetermined minimum value.

3. The device of claim 2 wherein the relay has a pair of normally closed contacts and the audio alarm is electrically energizable, and further comprising a source of electrical energy in series with the normally closed contacts and the audio alarm whereby, when the collector-emitter current in the transistor falls below the predetermined minimum value, the relay is de-energized and the alarm energized.

4. The device of claim 1 wherein the mechanical to electrical transducer comprises a piezoelectric device mechanically coupled to a vehicle steering shaft.

5. The device of claim 1 wherein the mechanical to electrical transducer comprises a first annular conductive member and a second conductive member slidably engaged therewith, the two conductive members sliding relative to one another during operator steering activity.

6. The device of claim 5 wherein the first and second conductive members comprise a portion of the vehicle horn actuating mechanism.

7. The device of claim 5 wherein the amplifier means comprises an input tuned circuit, a detector circuit, a first amplifier circuit having an input coupled to the tuned circuit and an output coupled to the detector circuit, and a second amplifier circuit having an input coupled to the detector circuit and an output coupled to said coupling means.

8. The device of claim 1 wherein the amplifier means comprises an input tuned circuit, a detector circuit, a first amplifier circuit having an input coupled to the tuned circuit and an output coupled to the detector circuit, and a second amplifier circuit having an input coupled to the detector circuit and an output coupled to said coupling means.

9. A safety device to be coupled to a vehicle steering mechanism for providing an alarm indicative of inadequate steering activity by a vehicle operator comprising:
mechanical to electrical transducer means for providing an electrical signal in response to steering activity by the operator for all operable positions of the steering mechanism, the transducer converting mechanical movement directly to electrical energy;
amplifier means coupled to the transducer for providing an output signal in response to the transducer electrical signal; and
circuit means responsive to the output signal for providing an alarm indication when the integral of the output signal with respect to time falls below a predetermined value, including a capacitor, means coupling the capacitor to the amplifier means for employing the output signal to maintain a charge on the capacitor in a preferred charge range, an energizable audio alarm, and means responsive to the charge on the capacitor falling outside the preferred charge range for energizing the audio alarm.

10. The device of claim 9 wherein the responsive means comprises a transistor with the base thereof connected to the capacitor whereby the conductivity of the transistor is determined at least in part by the charge on the capacitor.

11. The device of claim 10 further comprising a relay having the winding thereof in series with the collector-emitter circuit of the transistor whereby the relay is energized only when the collector-emitter current in the transistor is greater than a predetermined minimum value.

12. The device of claim 11 wherein the relay has a pair of normally closed contacts and the audio alarm is electrically energizable, and further comprising a source of electrical energy in series with the normally closed contacts of the audio alarm whereby, when the collector-emitter current in the transistor falls below the predetermined minimum value, the relay is deenergized and the alarm energized.

13. The device of claim 9 wherein the mechanical to electrical transducer comprises a piezoelectric device mechanically coupled to a vehicle steering shaft.

14. The device of claim 9 wherein the mechanical to electrical transducer comprises a first annular conductive member and a second conductive member slidably engaged therewith, the two conductive members sliding relative to one another during operator steering activity.

15. The device of claim 14 wherein the first and second conductive members comprise a portion of the vehicle horn actuating mechanism.

16. The device of claim 14 wherein the amplifier means comprises an input tuned circuit, a detector circuit, a first amplifier circuit having an input coupled to the tuned circuit and an output coupled to the detector circuit, and a second amplifier circuit having an input coupled to the detector circuit and an output coupled to said responsive means.

17. A safety device to be coupled to a vehicle steering mechanism for providing an alarm indicative of inadequate steering activity by a vehicle operator comprising:
mechanical to electrical transducer means for providing an electrical signal in response to steering activity by the operator for all operable positions of the steering mechanism;
amplifier means including a tuned circuit coupled to the transducer, a detector circuit, a first amplifier circuit having an input coupled to the tuned circuit and an output coupled to the detector circuit, and a second amplifier circuit having an input coupled to the detector circuit and an output; and
means responsive to the second amplifier output for providing an alarm indication when the electrical signal provided by the transducer fails to satisfy a prescribed minimum condition.

* * * * *